(12) United States Patent
Adam

(10) Patent No.: US 11,615,283 B2
(45) Date of Patent: Mar. 28, 2023

(54) SYSTEM AND METHOD FOR PRODUCING A STRIP OF MATERIAL WITH AN INTEGRATED ELECTRONIC COMPONENT

(71) Applicant: Texmag GmbH Vertriebsgesellschaft, Thalwil (CH)

(72) Inventor: Jens-Oliver Adam, Scharnhorst (DE)

(73) Assignee: Texmag GmbH Vertriebsgesellschaft, Thalwil (CH)

( * ) Notice: Subject to any disclaimer, the term of this patent is extended or adjusted under 35 U.S.C. 154(b) by 216 days.

(21) Appl. No.: 16/899,964

(22) Filed: Jun. 12, 2020

(65) Prior Publication Data
US 2020/0394489 A1 Dec. 17, 2020

(30) Foreign Application Priority Data
Jun. 13, 2019 (DE) .......................... 102019116163.0

(51) Int. Cl.
*G06K 19/077* (2006.01)
*G06K 17/00* (2006.01)
(Continued)

(52) U.S. Cl.
CPC ....... *G06K 19/07718* (2013.01); *B31D 1/021* (2013.01); *B31D 1/028* (2013.01); *G06K 17/0025* (2013.01); *B29C 65/7459* (2013.01); *Y10T 156/1067* (2015.01); *Y10T 156/13* (2015.01)

(58) Field of Classification Search
CPC ................................................. B29C 65/7459
See application file for complete search history.

(56) References Cited

U.S. PATENT DOCUMENTS 2,391,539 A * 12/1945 Stanton .................. B31D 1/021
156/259
7,686,909 B2 * 3/2010 Cheng .................. H05K 3/0052
156/271
(Continued)

FOREIGN PATENT DOCUMENTS

DE 4392791 T1 6/1995
DE 102012006032 A1 10/2013
(Continued)

OTHER PUBLICATIONS

Search Report for German Patent Application No. 102019116163.0 dated Jan. 24, 2020, 8 pages.
(Continued)

*Primary Examiner* — Linda L Gray
(74) *Attorney, Agent, or Firm* — Goodwin Procter LLP

(57) ABSTRACT

The method for producing a strip of material with an integrated electronic component comprises the following steps according to the present invention: feeding a material web, cutting a first piece of material from the material web, lifting the first piece of material, applying an electronic component to the material web, once again feeding the material web with the electronic component located on it, cutting a piece of material from the material web to obtain a second piece of material on which the electronic component is located, and applying the first piece of material to the second piece of material so that the electronic component is accommodated between the first piece of material and the second piece of material.

13 Claims, 3 Drawing Sheets

(51) Int. Cl.
    *B31D 1/02*   (2006.01)
    *B29C 65/74*  (2006.01)

(56) References Cited

U.S. PATENT DOCUMENTS

| | | |
|---|---|---|
| 2002/0195195 A1 | 12/2002 | Grabau et al. |
| 2006/0244662 A1* | 11/2006 | Bauer ................ H01Q 1/22 |
| | | 343/795 |
| 2010/0212791 A1 | 8/2010 | Incavo et al. |
| 2011/0284155 A1 | 11/2011 | Sevaille et al. |

FOREIGN PATENT DOCUMENTS

| | | | |
|---|---|---|---|
| EP | 1724127 A2 | 11/2006 | |
| KR | 20100082464 A | 7/2010 | |
| KR | 20100120505 A | 11/2010 | |
| KR | 20160050452 A | 5/2016 | |
| WO | WO-2011002440 A1 * | 1/2011 | ......... B29D 30/0061 |
| WO | 2014181310 A1 | 11/2014 | |

OTHER PUBLICATIONS

Partial European Search Report for European Patent Application No. 20178169.7 dated Nov. 11, 2020, 9 pages.

* cited by examiner

SYSTEM AND METHOD FOR PRODUCING A STRIP OF MATERIAL WITH AN INTEGRATED ELECTRONIC COMPONENT

RELATED APPLICATIONS

This application claims a right of priority under 35. U.S.C. § 119(a) to German application DE 102019116163.0, filed Jun. 13, 2019.

FIELD OF THE INVENTION

The present invention relates to a method and a device for producing a strip of material with an integrated electronic component. In particular, the present invention relates to a method and a device for producing a rubber strip with an integrated RFID chip.

BACKGROUND OF THE INVENTION

Prior art examples of systems and methods for integrating RFID chips into car and truck tires for logistical and quality assurance purposes are known. RFID chips integrated into such tires makes it possible to monitor traffic and prove any theft of the tires or wheels.

It is likewise known for strips of material to be produced from unvulcanized rubber with an integrated RFID chip, referred to as RFID tags, which, during tire production, are then vulcanized together with the rubber to produce the tire. To produce such strips of material with an integrated RFID chip, two separate material webs are unwound from a roll and RFID chips are integrated between these two material webs and then laminated before the material webs are cut into strips of material or RFID tags.

One problem with known prior art the methods is that the devices for producing a strip of material with an integrated electronic component are large and take up a large amount of space in a production facility. It would therefore be desirable to provide a device or devices having a smaller footprint in the production facility.

SUMMARY OF THE INVENTION

The aforementioned problem is solved by the methods and systems described herein.

One embodiment of a method of the present invention for producing a strip of material with an integrated electronic component comprises the following steps: feeding a material web, cutting a first piece of material from the material web, lifting the first piece of material, applying an electronic component to the material web, once again feeding the material web with the electronic component located on it, cutting a piece of material from the material web to obtain a second piece of material on which the electronic component is located, and applying the first piece of material to the second piece of material so that the electronic component is disposed between the first piece of material and the second piece of material.

According to the invention, the first piece of material and the second piece of material are cut from the same material web. As a result, only one device is required to unwind and feed a single material web of unvulcanized rubber. The footprint of the devices implementing the method in the production facility is thereby reduced, as a device for unwinding a second material web of unvulcanized rubber can be eliminated. The working process is also simplified because the production facility only has to be fitted with one device for handling a material web of unvulcanized rubber.

The pieces of material can be connected to one another through the applying process provided they have sufficiently adhesive contact surfaces. However, the first piece of material and the second piece of material can also additionally be connected or laminated to obtain a strip of material with an integrated electronic component.

The electronic component preferably has a memory and at least one antenna, wherein the (at least one) antenna can be used to exchange information, to write to and/or read from the memory and, if applicable, to supply power. In preferred embodiments of the invention, the electronic component is preferably an RFID chip with at least one antenna. The first piece of material and the second piece of material, in a preferred embodiment, consist of unvulcanized rubber.

According to the invention, it is also possible for the first piece of material and the second piece of material to be of different sizes and for one piece of material to be applied to the other piece of material offset to it. This enables different shapes of strips of material to be achieved. In prior art methods, only pieces of material of the same size are possible, with the edges of the pieces of material having exactly the same x- and y-alignment, wherein the x-axis is the feed direction during production; the y-axis is the transverse direction in relation to the feed direction; and the z-axis is perpendicular to the main surfaces of the pieces of material. According to the invention, it is also possible for one piece of material to be smaller than the other piece of material so that a trapezoidal structure is formed in cross section when the centroids of the area are identically aligned. Alternatively, one of the pieces of material can be offset in the x- and y-directions compared to the other piece of material so that a "Z-design" is produced when the centroids of the area are correspondingly offset, but with edges preferably aligned in parallel. Furthermore, one of the pieces of material can be offset in relation to the other piece of material in the x-direction only, with the edges preferably aligned in parallel to obtain a "rhomboid design".

The applying of the electronic component, in particular of the RFID chip, to the material web can be carried out after the first piece of material has been cut from the material web to produce a strip of material with the electronic component. Alternatively, the application of the electronic component can be carried out before the first piece of material and the second piece of material have been cut from the material web to produce a strip of material with the electronic component. In both cases, the material web with the electronic component arranged thereon may be passed through by a cutting device. This again brings with it benefits in terms of space since the device for applying the electronic component can be arranged upstream, for example above and ahead of the cutting device.

The lifting of the first piece of material and the cutting of the second piece of material can preferably be carried out simultaneously. In one embodiment of the invention, these processes can thereby be carried out in parallel so that the production speed is increased. In other embodiments, the cutting of the first piece of material and the cutting of the second piece of material can also be carried out simultaneously, by, for example, using a double knife. In yet other embodiments, it is possible for the applying of the first piece of material and the cutting of the second piece of material to be carried out simultaneously.

The method for producing a strip of material with an integrated electronic component can, in accordance with other embodiments of the present invention, also be implemented with the following steps: feeding a material web, cutting a first piece of material from the material web, cutting a second piece of material from the material web, applying an electronic component to the second piece of material, and applying the first piece of material to the second piece of material so that the electronic component is accommodated between the first piece of material and the second piece of material. The first piece of material can then be joined with the second piece of material to obtain a strip of material with an integrated electronic component. In preferred embodiments of the invention, the first piece of material and the second piece of material are joined by being laminated together. In this embodiment, only one device is required to unwind and feed a single material web of unvulcanized rubber. However, the electronic component is not applied to the material web upstream of the cutting device, but instead to an already cut piece of material downstream of the cutting device.

The successive pieces of material produced can be applied to a strip which is adhesive on one side or to a carrier web which is then wound up into a roll. During tire production, typically performed at a separate tire production facility, the pieces of material can thereby be automatically removed from the roll.

Within the meaning of the invention, the strip of material is, in general, preferably configured to connect to a rubber for tire production. Therefore, a method for producing a strip of material according to the invention, in entirely general terms, preferably comprises the final step of connecting the strip of material produced to a rubber for producing a tire.

A system for producing a strip of material with an integrated electronic component comprising, according to the present invention: a device for feeding a material web of unvulcanized rubber, a cutting device, a device for applying an electronic component to the material web or to a piece of material which has been cut from the material web, a device for lifting a piece of material which has been cut from the material web, and for then applying the lifted piece of material to a further cut piece of material so that the electronic component is accommodated between the two pieces of material. A second device for feeding a material web of unvulcanized rubber can thereby be eliminated. The system may further comprise a device for connecting the two pieces of material to obtain a strip of material with an integrated electronic component. The system may also further comprise a device to apply the strips of material with an integrated electronic component to a transportation web or to a carrier web and to wind the transportation web or carrier into a roll after application.

In general terms, provision is preferably made for a system according to the invention for carrying out a method according to the invention.

According to the invention, provision is made here for the system to be configured to process a material web of unvulcanized rubber and/or of pieces of material of unvulcanized rubber.

DETAILED DESCRIPTION OF THE INVENTION

Figure 5:
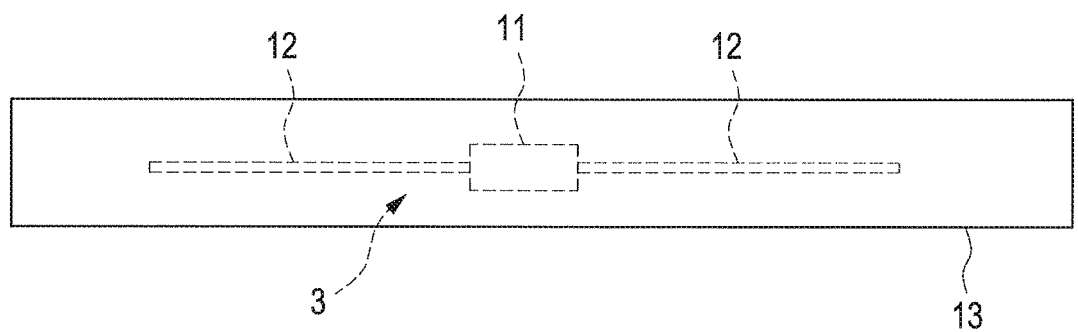
FIG. 5 shows a view from above of a strip of material with an integrated electronic component according to an exemplary embodiment of the present invention.

FIG. 5 shows a view from above of a strip of material 13 with an integrated electronic component 3, according to an exemplary embodiment of the present invention. Because the electronic component 3 is arranged between two pieces of material, it cannot be seen from outside. FIG. 5 therefore shows the representation of the electronic component 3 only as a representation of its position within the strip of material 13.

An electronic component 3, according to the present invention, preferably has a memory and at least one antenna 12, wherein the antenna(s) can be used to exchange information, to write to and/or read from the memory and, if applicable, to supply power to the electronic component. In preferred embodiments, the electronic component is an RFID chip 11 with two antennas 12, as shown in FIG. 5.

In exemplary embodiments of the invention, the strip of material with an integrated electronic component can, for example, be 30 to 150 mm in length, in particular 50 to 120 mm in length, further preferably 50 to 70 mm in length. The width may be, for example, 3 to 50 mm, in particular 5 to 20 mm, further preferably 8 to 12 mm. The height may be, for example, 0.3 to 4 mm, in particular 0.5 to 1 mm, further preferably 0.6 to 0.8 mm.

Figure 1:
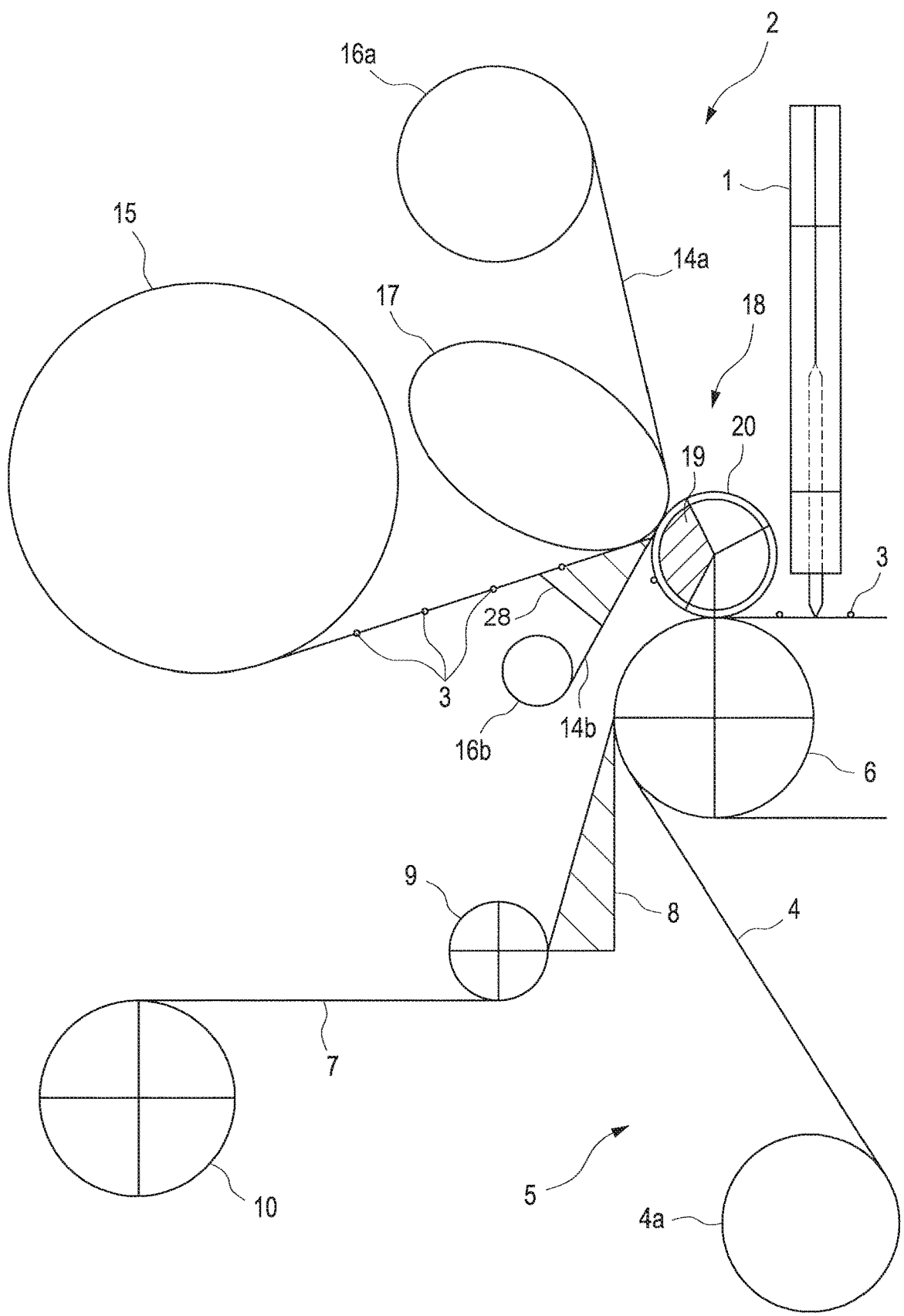
FIG. 1 shows a system with a cutting device and a device for applying an electronic component to the material web according to an exemplary embodiment of the present invention.

FIG. 1 shows a system with a cutting device 1 and a device 2 for applying an electronic component 3 to a material web 4 according to an exemplary embodiment of the present invention. The material web 4 preferably consists of unvulcanized rubber.

The material web 4 is fed by a device 5 for feeding the material web. The material web 4 is first wound up on a roller 4a and unwound by the feeding device and fed to the cutting device 1 preferably via a driven guide roller or conveyor 6.

The material web 4 may be covered with an intermediate film or a protective material 7. This protective material 7 is deflected in the area of the guide roller 6, for example around a baffle or a wedge 8, to remove the protective material 7 from the material web 4. The protective material 7 can then be deflected by a further guide roller 9 and wound up via a roller 10.

The individual electronic components 3 may first be arranged between a blister tape 14a and a blister foil 14b which are wound on a roller 15. The blister tape 14a and the blister foil 14b are unwound from the roller 15 with the electronic components 3. The blister tape 14a is then wound up by a roller 16a and the blister foil 14b is wound up by a roller 16b. The blister foil 14b is deflected here by a baffle or a wedge 28 and the blister tape 14a is deflected by a pressing element 17. The pressing element 17 is preferably configured longitudinally with a round or oval cross section.

Although the electronic components 3 are wound up on a roller in the exemplary embodiment shown, they can also be fed to blister sheets according to the invention.

The pressing element 17 adjoins a transfer mechanism 18. The individual electronic components are transferred from this area (in which the blister tape 14*a* and the blister foil 14*b* are separated from one another) to the material web 4. For this purpose, the transfer mechanism 18 preferably has a rotatable roller 20 and a fixed magnetic area 19 arranged within the roller 20. An electronic component is held on the roller 20 by the magnetic force and then automatically released such as to remain lying on the material web 4.

Instead of the transfer mechanism 18 described above, the latter can also be configured with a partially magnetic belt (instead of a partially magnetic roller) or as a mechanism with a gripping system.

The material web 4 is then cut into individual pieces of material by the cutting device 1. This cutting device can be configured in numerous ways, for example with a knife passing through (for example a punching knife or a guillotine knife) which is moved from the top downward, with a rolling knife which is moved transversely to the material web, or with a knife which is located on a rotating roller (referred to as a cross-cutter).

Figure 2:
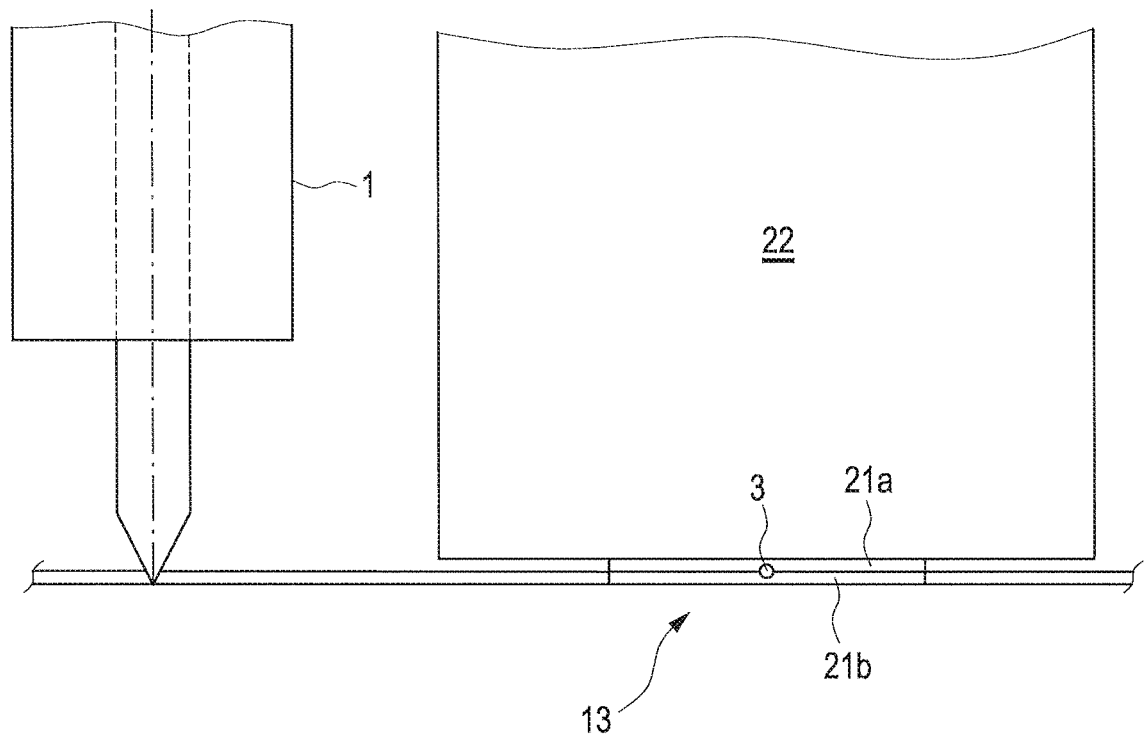
FIG. 2 shows a cutting device and a device for lifting a piece of material according to an exemplary embodiment of the present invention.

The cutting device may be driven by a controller (not shown) such that alternately a first piece of material 21*a* on which there is no electronic component 3 is cut and then a second piece of material 21*b* on which there is an electronic component 3 is cut (See FIG. 2).

FIG. 2 shows a cutting device 1 and a device 22 for lifting a piece of material according to an exemplary embodiment of the present invention. The device 22 positions the first piece of material 21*a* (without an electronic component), for example, by lifting, so that the second piece of material 21*b* with electronic component can be arranged in a preferred orientation with respect to the first piece of material, for example, underneath the first piece of material in instances wherein the first piece of material is lifted. The first piece of material 21*a* is then lowered again so that the electronic component 3 is disposed or accommodated between the two pieces of material 21*a*, 21*b*. For this purpose, the device 22 can have either a mechanical gripper or a vacuum gripper.

Figure 3:
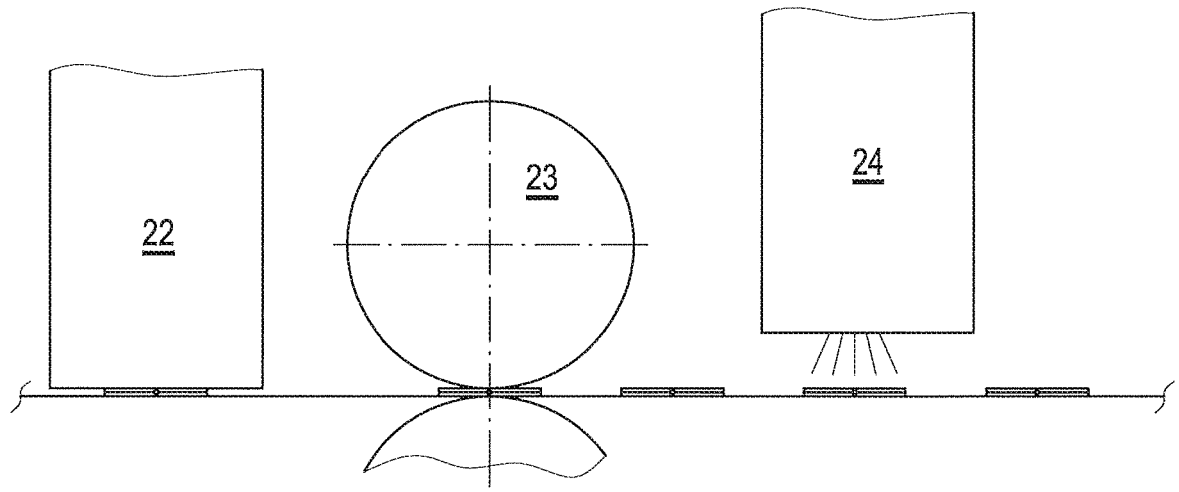
FIG. 3 shows devices according to an exemplary embodiment of the present invention which are arranged after or downstream of the cutting device.

FIG. 3 shows devices according to an exemplary embodiment of the present invention which are arranged after or downstream of the cutting device. Arranged after the device 22 for lifting a piece of material are two rollers of a device 23 for connecting the two pieces of material to obtain a strip of material 13 with an integrated electronic component. This device 23 is preferably a laminating device so that the pieces of material with the electronic component arranged therebetween are connected to one another with the application of pressure.

Furthermore, a device 24 can be provided to transfer information to the electronic component 3 (or, more precisely, to the memory of the electronic component via the at least one antenna 12) and/or to test the functioning of the electronic component 3. A provision can also be made for an inspection device to check the quality of the strip of material or of the RFID tag 13 and an expulsion device to separate off any faulty strips of material or RFID tags 13.

Figure 4:
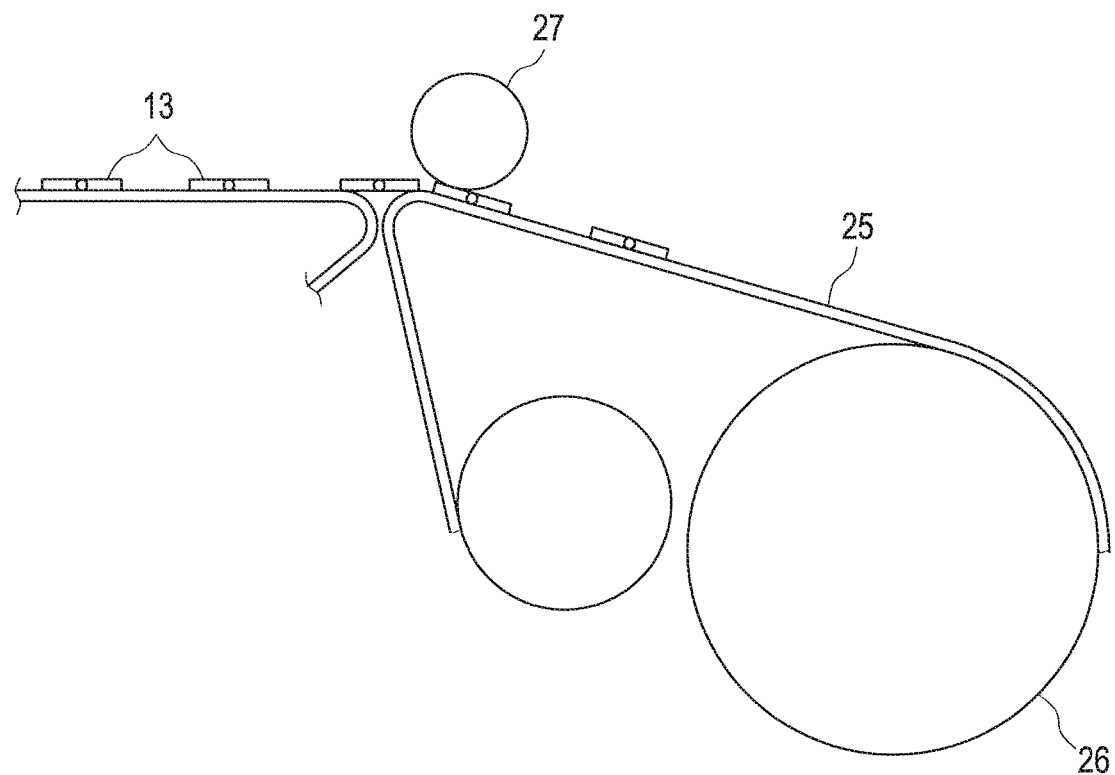
FIG. 4 shows a device for winding the strips of material with an integrated electronic component onto a transportation web which is adhesive on one side or onto a carrier web according to an exemplary embodiment of the present invention.

FIG. 4 shows a device for winding the strips of material (13) with an integrated electronic component onto a transportation web which is adhesive on one side or a carrier web 25 according to an exemplary embodiment of the present invention. The strips of material or the RFID tags are pressed onto the carrier web via a roller 27. The carrier web 25 together with the strips of material 13 or the RFID tags are then wound up onto a roller 26 so that they can then easily be fed again automatically at a tire production facility.

At the tire production facility, a strip of material 13 with an integrated electronic component 3 is connected to the rubber for the tire production and vulcanized together so that the electronic component is ultimately integrated in the tire.

Although the electronic component 3 is applied to the material web 4 before the cutting device in the exemplary embodiment explained above, it is also possible for an electronic component 3 to be applied to an already cut piece of material 21*a*, 21*b* after the cutting device.

It is also possible, according to the present invention, for the electronic component to be applied to the first piece of material 21*a* (instead of the second piece of material) or to that part of the material web 4 which is then cut as the first piece of material 21*a*, and then for the second piece of material 21*b* to be applied to the first piece of material 21*a*.

As would be realized by one of skill in the art, variations in arrangement and operation of the above-described system, and variations in the materials and sizes of components used in the method are possible and will still be considered within the scope of the invention, which is clearly set forth in the following claims.

The invention claimed is:

1. A method for producing a strip of material with an integrated electronic component, comprising:
    feeding a material web of unvulcanized rubber;
    cutting a first piece of unvulcanized rubber from the material web;
    applying an RFID chip to the material web;
    positioning the first piece of unvulcanized rubber with respect to the RFID chip;
    cutting a second piece of unvulcanized rubber from the material web on which the RFID chip is located wherein the first piece and the second piece of unvulcanized rubber are completely separated from the material web after cutting; and
    applying the first piece of unvulcanized rubber to the second piece of unvulcanized rubber so that the RFID chip is disposed between the first piece of unvulcanized rubber and the second piece of unvulcanized rubber.

2. The method of claim 1, wherein the applying of the RFID chip to the material web of unvulcanized rubber is carried out before the first piece of unvulcanized rubber and the second piece of unvulcanized rubber have been cut from the material web of unvulcanized rubber.

3. The method of claim 1, wherein positioning the first piece of unvulcanized rubber with respect to the RFID chip comprises:
    lifting the first piece of unvulcanized rubber; and
    cutting the second piece of unvulcanized rubber simultaneous with the lifting of the first piece of unvulcanized rubber.

4. A method, comprising:
    cutting a first piece of unvulcanized rubber from a material web wherein the first piece of unvulcanized rubber is completely separated from the material web;
    cutting a second piece of unvulcanized rubber from the material web, wherein the second piece of unvulcanized rubber is completely separated from the material web and separate from the first piece of unvulcanized rubber;
    positioning the first piece of unvulcanized rubber at a different position;
    transferring an RFID chip from a feeding device;
    placing the RFID chip on the second piece of; and applying the first piece of unvulcanized rubber to the second piece of unvulcanized rubber such that the RFID chip is disposed between the first piece of unvulcanized rubber and the second piece of unvulcanized rubber.

5. The method of claim 4, wherein the cutting of the first piece of unvulcanized rubber and the cutting of the second piece of unvulcanized rubber are carried out simultaneously.

6. The method of claim 4, wherein applying the first piece of unvulcanized rubber to the second piece of unvulcanized rubber, further comprises:
connecting the first piece of unvulcanized rubber to the second piece of unvulcanized rubber to form a strip of unvulcanized rubber.

7. The method of claim 4, wherein the second piece of unvulcanized rubber is cut after the first piece of unvulcanized rubber has been cut.

8. The method of claim 6, wherein the connecting of the first piece of unvulcanized rubber to the second piece of unvulcanized rubber comprises applying pressure to the strip of unvulcanized rubber.

9. The method of claim 8, wherein the first piece of unvulcanized rubber and the second piece of unvulcanized rubber are laminated, with the RFID chip disposed therebetween.

10. The method of claim 4, wherein the RFID chip has a memory and at least one antenna.

11. A method, comprising:
cutting a first piece of unvulcanized rubber from a material web wherein the first piece of unvulcanized rubber is completely separated from the material web;
lifting the first piece of unvulcanized rubber;
cutting a second piece of unvulcanized rubber material from the material web wherein the second piece of unvulcanized rubber is completely separated from the material web;
positioning the first piece of unvulcanized rubber at a different location;
obtaining an RFID chip from a feeding device;
lifting the second piece of unvulcanized rubber;
positioning the RFID chip on the first piece of unvulcanized rubber;
positioning the second piece of unvulcanized rubber over the RFID chip; and
connecting the first piece of unvulcanized rubber and the second piece of unvulcanized rubber to one another to hold the RFID chip between the first piece of unvulcanized rubber and the second piece of unvulcanized rubber.

12. The method of claim 11, wherein positioning the second piece of unvulcanized rubber over the RFID chip, further comprises:
positioning the second piece of unvulcanized rubber in an orientation with respect to the first piece of unvulcanized rubber.

13. The method of claim 11, wherein the first piece of unvulcanized rubber has a first size and the second piece of unvulcanized rubber has a second size, and the first size is different from the second size.

* * * * *

UNITED STATES PATENT AND TRADEMARK OFFICE
CERTIFICATE OF CORRECTION

| | |
|---|---|
| PATENT NO. | : 11,615,283 B2 |
| APPLICATION NO. | : 16/899964 |
| DATED | : March 28, 2023 |
| INVENTOR(S) | : Jens-Oliver Adam |

It is certified that error appears in the above-identified patent and that said Letters Patent is hereby corrected as shown below:

In the Claims

At Column 6, Claim number 1, Line number 35, replace "RFID chip is located" with --RFID chip is located,--

At Column 6, Claim 4, Line 67, replace "RFID chip on the second piece of" with --RFID chip on the second piece of unvulcanized rubber--

At Column 8, Claim 11, Line 2, replace "cutting a second piece of unvulcanized rubber material" with --cutting a second piece of unvulcanized rubber--

Signed and Sealed this
Twentieth Day of June, 2023

Katherine Kelly Vidal
*Director of the United States Patent and Trademark Office*